United States Patent [19]
Magid

[11] Patent Number: 5,411,279
[45] Date of Patent: May 2, 1995

[54] MULTIPLE-BELT CONVEYING APPARATUS WITH FLAT TOP SURFACE

[76] Inventor: Sidney H. Magid, c/o Hung Hsing Patent Service Center, P.O. Box 55-1670, Taipei (104), Taiwan, Prov. of China

[21] Appl. No.: 169,143

[22] Filed: Dec. 17, 1993

[51] Int. Cl.[6] .............................................. A63B 23/06
[52] U.S. Cl. ........................... 280/47.38; 280/87.051; 482/54; 198/833
[58] Field of Search ...................... 280/87.051, 47.38; 482/54; 198/833, 841

[56] References Cited

U.S. PATENT DOCUMENTS

| | | | |
|---|---|---|---|
| 3,967,720 | 7/1976 | Arieh | 198/833 |
| 4,650,067 | 3/1987 | Brulé | 198/841 |
| 4,743,008 | 5/1988 | Fermaglichz et al. | 482/54 |
| 4,757,987 | 7/1988 | Allemand | 482/54 |
| 5,080,383 | 1/1992 | Hsieh | 280/87.051 |

*Primary Examiner*—Richard M. Camby

[57] ABSTRACT

A multiple-belt conveying apparatus includes at least one endless inner belt movably wound on at least one substrate plate secured to a base having two arcuate end portions disposed on a front end portion and a rear end portion of the substrate plate for movably winding the endless inner belt on the two arcuate end portions of the substrate plate, having an inner slipping surface and an outer frictional surface; and an endless outer belt movably wound on a front roller and a rear roller fixed on a base, the outer belt movably overlapping the inner belt (or belts) with an inner surface of the outer belt frictionally contacting the outer frictional surface of the inner belt, and the inner belt having its inner slipping surface slidably contacting an upper slipping surface formed on an upper surface of the substrate plate, thereby providing a belt conveying apparatus having a flat top surface for comfortable and minimum stress loading, riding or walking on the outer belt and also for a smooth movement of the belts.

8 Claims, 5 Drawing Sheets

MULTIPLE-BELT CONVEYING APPARATUS WITH FLAT TOP SURFACE

BACKGROUND OF THE INVENTION

A conventional belt conveyer as shown in FIG. 1 includes an endless belt B wound on a pair of rollers R for conveying purpose, on which the belt B will sag ("S") after being loaded by weight G of goods or person(s), causing unsmooth moving of the belt and uncomfortable standing or walking on such a sagging belt.

Even though a plurality of intermediate rollers R1 as shown in FIG. 2 may be provided in between the front and rear rollers R to prevent the sagging defect as aforementioned, the plural intermediate rollers R1 will form a corrugated surface C which still causes uncomfortable feeling when trodden by someone's foot thereon.

If a flat supporting surface S1 is located beneath the belt B as shown in FIG. 3, the corrugated surface as found in FIG. 2 will then be overcome. However, the load G on the belt B may cause a friction F between the belt B and the supporting surface S1, influencing or retarding the movement of the belt B.

SUMMARY OF THE INVENTION

The object of the present invention is to provide a conveying apparatus of multiple belts including at least one endless inner belt movably wound on at least one substrate plate secured to a base with each substrate plate having two arcuate end portions disposed on a front end portion and a rear end portion of the substrate plate for movably winding the endless inner belt around the two arcuate end portions of the substrate plate, with the inner belt having an inner slipping surface and an outer frictional surface; and an endless outer belt movably wound on a front roller and a rear roller fixed on the base, the outer belt movably overlapping the inner belt with an inner surface of the outer belt frictionally contacting the outer frictional surface of the inner belt, and the inner belt having its inner slipping surface slidably contacting an upper slipping surface formed on an upper surface of the substrate plate, thereby providing a belt conveying apparatus having a flat top surface for comfortable and minimum stress loading, riding or walking on the outer belt and also for a smooth movement of the belts.

DETAILED DESCRIPTION

Figure 1:
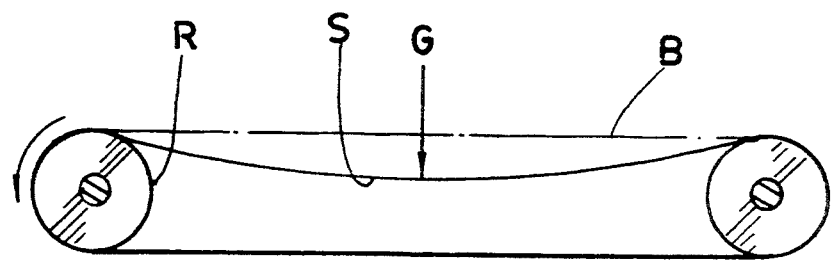
FIG. 1 shows a first conventional conveyor.
Figure 2:
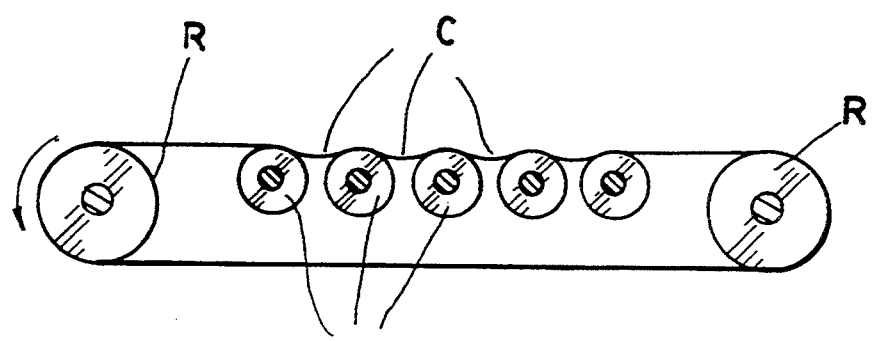
FIG. 2 shows a second conventional conveyor.
Figure 3:
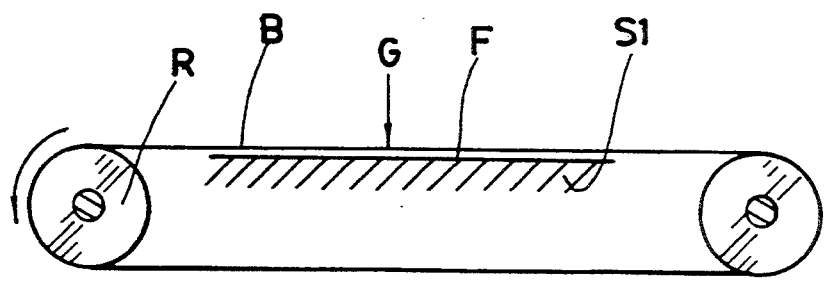
FIG. 3 shows a third conventional conveyor.
Figure 4:
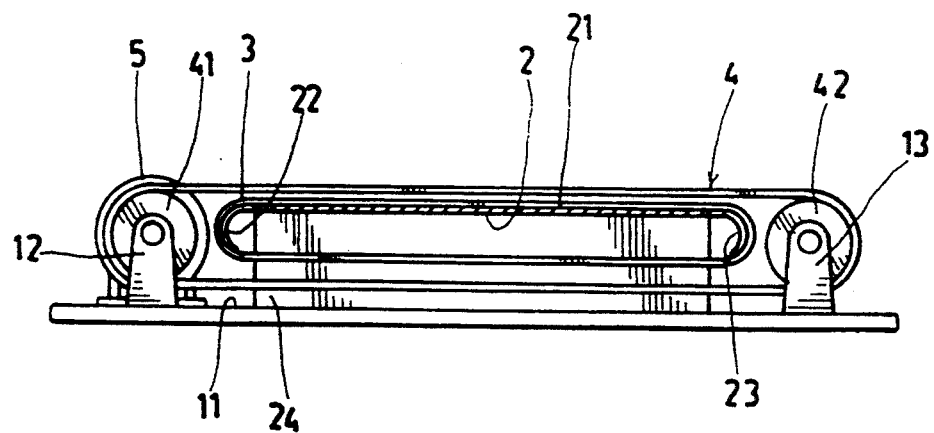
FIG. 4 is a sectional drawing of the present invention.
Figure 5:
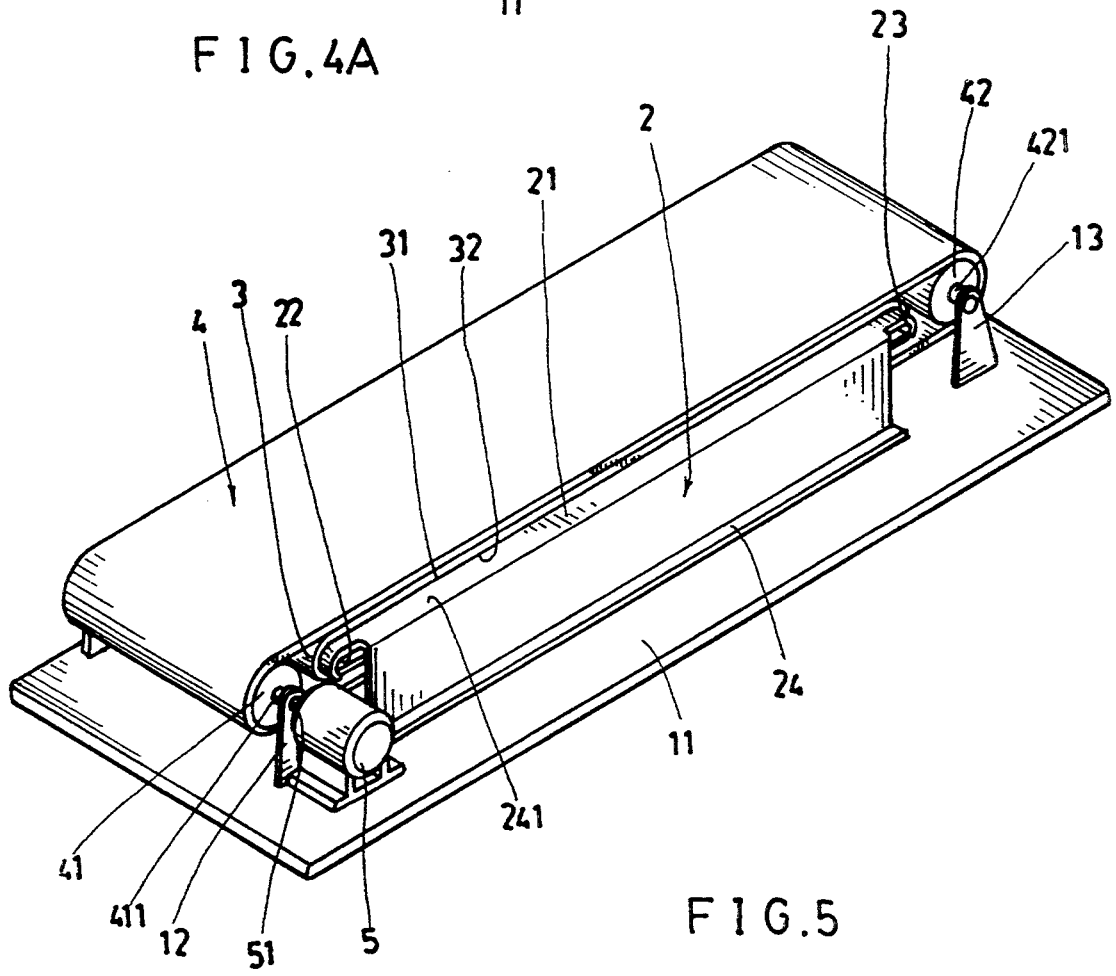
FIG. 5 is a perspective view of the present invention.
Figure 6:
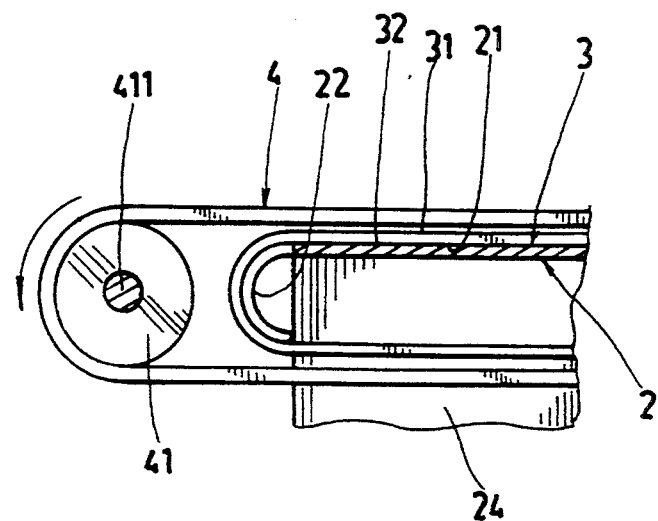
FIG. 6 is a partial enlarged sectional drawing of the present invention showing a relationship among the outer belt, the inner belt, and the substrate plate.
Figure 7:
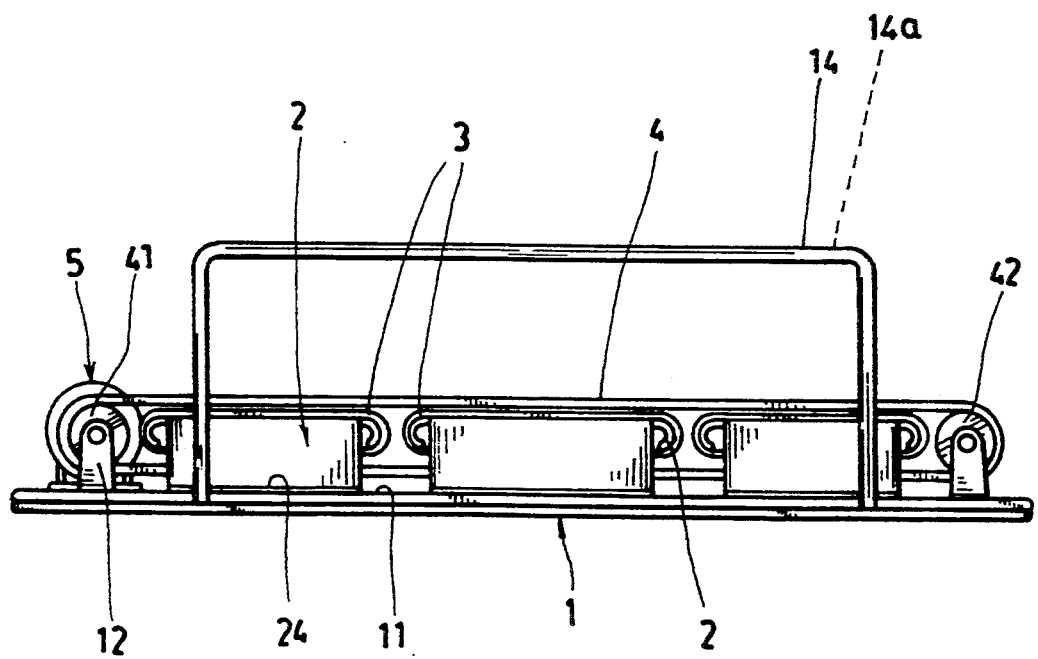
FIG. 7 is a sectional drawing illustrating another preferred embodiment of the present invention.
Figure 8:
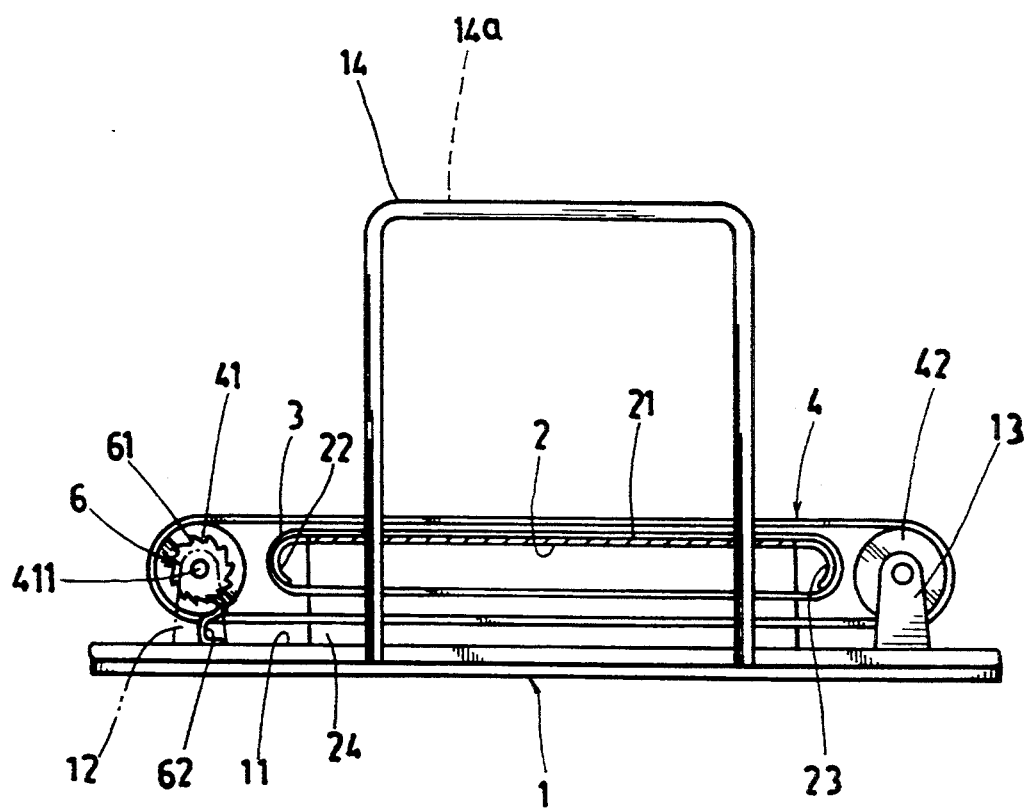
FIG. 8 shows a treadmill mounted with a one-direction control means in accordance with the present invention.
Figure 9:
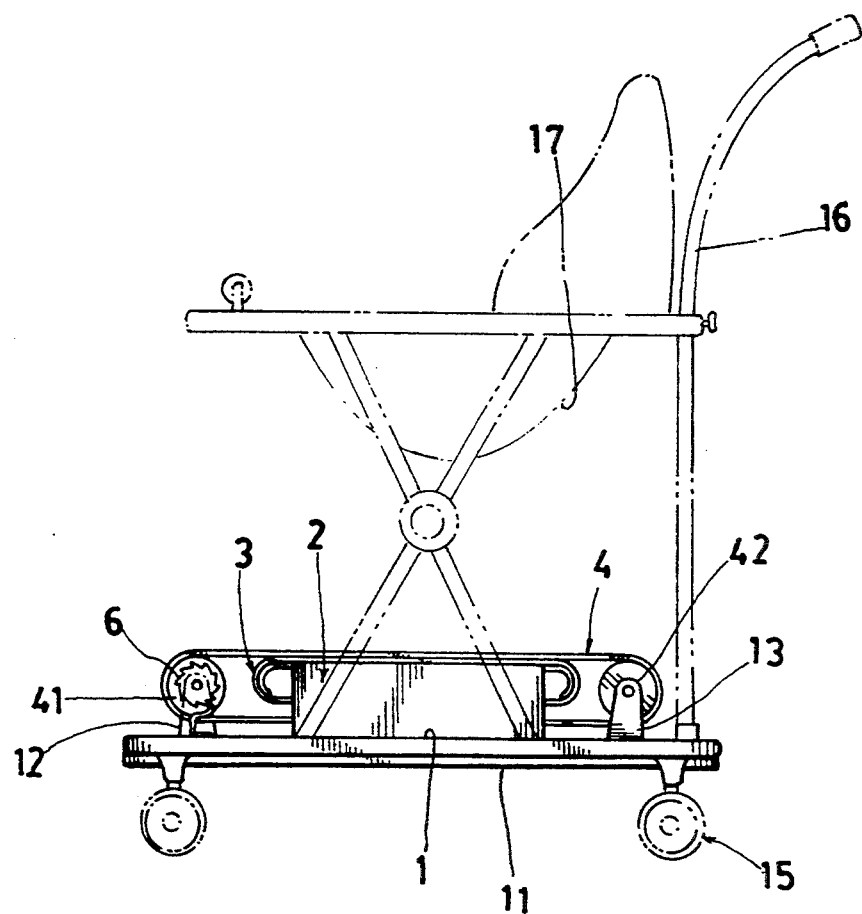
FIG. 9 shows a baby stroller as developed for the functional supporting frame of the present invention.

As shown in FIGS. 4-6, the present invention comprises: a base 11, a substrate plate 2, an endless inner belt 3, an endless outer belt 4, and a driving motor 5. The base 11 may be attached to a functional supporting frame I as shown in FIGS. 7-9.

The substrate plate 2 has a flat slipping surface 21 formed on an upper surface of the plate 2, two arcuate end portions 22, 23 disposed on a front end portion and a rear end portion of the substrate plate 2, and a pair of side brackets 24 securing two longitudinal side edge portions 241 of the plate 2 on the base 11.

The endless inner belt 3 includes: an outer frictional surface 31 in contact with an inner surface of the endless outer belt 4, and an inner slipping surface 32 made of slipping materials to be in contact with the slipping surface 21 of the substrate plate 2, with the endless inner belt 3 movably wound on the two arcuate end portions 22, 23 formed on the front and rear end portions of the substrate plate 2.

Figure 4A:
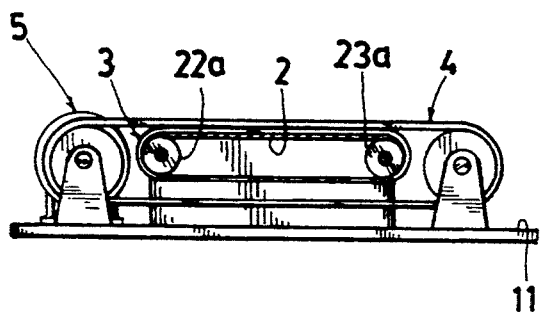
FIG. 4a is a modification of FIG. 4.

As shown in FIG. 4a, the two arcuate end portions 22, 23 may be modified to two inner rollers 22a, 23a for rotatably winding the inner belt 3 on the two inner rollers 22a, 23a.

The endless outer belt 4 is made of frictional materials and wound on a front roller 41 and a rear roller 42 rotatably mounted, by a front shaft 411 and a rear shaft 421, on front and rear brackets 12, 13 respectively secured on front and rear end portions of the base 11.

The front roller 41 of the endless outer belt 4 may be driven by a driving motor 5 by connecting the front shaft 411 of the front roller 41 with a driving shaft 51 of the driving motor 5. The driving motor 5 may also be secured to the rear roller 42.

By installing the driving motor 5 onto either the roller 41 or roller 42, the present invention may serve as a conveyor for carrying people such as used in an escalator, or for conveying goods loaded on the belt 4, or as a treadmill for a running machine for exercising. Without motor 5, the belt 4 may be run by someone to serve as a treadmill for exercise purpose or a baby walker if walked by a baby.

The present invention is superior to a conventional conveyor because of the following advantages:

1. Due to the multiple belts especially to the inner and outer belts 3, 4 on the substrate plate 2 of this invention, a flat top surface of a conveyor may be achieved to provide a comfortable flat surface as trodden by someone's feet thereon.

2. As supported by the flat substrate plate 2 of the present invention, the belts 3, 4 will not sag for smoothly carrying of goods or conveying of persons on the belts.

3. The most important characteristic features are the double-belt concept, with the inner belt 3 having an inner slipping surface 32 slidably contacting the upper sliding surface 21 on the upper surface of the substrate plate 2 and having an outer frictional surface 31 frictionally contacting the outer belt 4 so that the belts 3, 4 can be movable either manually, by foot or electrically driven by motor, and the inner belt 3 with its sliding on the slipping surface 21 of the substrate plate 2 preventing a frictional braking or retarding on the substrate plate 2, thereby enhancing a smooth, comfortable flat surface on the belts 4, 3 and also preventing any frictional obstruction therefrom.

As shown in FIG. 7, it may be provided with a plurality of inner belts 3 and substrate plate 2 within a unique outer belt 4 for a long-distance conveyor such as for mass transportation uses or industrial conveying purposes.

A pair of handrails 14, 14a may be mounted on the base of the functional supporting frame 1 for resting someones' hands thereon.

As shown in FIG. 8, a one-direction control means 6 is provided in this invention, which includes a ratchet gear 61 secured with a shaft such as a front shaft 411 of the front roller 41 (or the rear roller 42) of the outer belt 4, and a pawl 62 secured to the base 11 and slidably engageable with the ratchet gear 61 to allow one-way movement when trodden on the belt 4 by a user's or walker's foot, but preventing a reverse-direction movement thereof. A treadmill, for instance, will thus be provided by adding a pair of handrails 14, 14a of the functional supporting frame 1 as shown in FIG. 8.

By substituting the elements of a baby stroller to the handrails 14, 14a of FIG. 8 as shown in FIG. 9, the present invention will provide a baby walker and stroller including a functional supporting frame 1 having wheels 15 rotatably mounted to the base of functional supporting frame 1, having a baby seat 17 mounted on the base of functional supporting frame 1 and a removable handle 16 detachably mounted to base of functional supporting frame 1.

Various Modifications of the functional supporting frame 1 can be made in accordance with the present invention without departing from the scope and structure as claimed in this invention.

It is the intent of this invention that the base of the conveying apparatus may be separate and attachable to the functional supporting frame or that it is supplied as an integral part in the functional supporting frame to be base for the conveying apparatus.

I claim:

1. A multiple-belt conveying apparatus comprising:
   a base, said base attachable to a functional supporting frame;
   a substrate plate having a flat slipping surface formed on an upper surface of the plate, two arcuate end portions, disposed on a front end portion and a rear end portion of the substrate plate, and a pair of side brackets securing two longitudinal side edge portions of the substrate plate on the base;
   an endless inner belt having an outer frictional surface in contact with an inner surface of an endless outer belt, and an inner slipping surface made of slipping materials to be in contact with the slipping surface of the substrate plate, with the endless inner belt movably wound on the two arcuate end portions formed on the front and rear end portions of the substrate plate; and
   the endless outer belt made of frictional materials and wound on a front roller and a rear roller rotatably mounted, by a front shaft and a rear shaft, on a front bracket and a rear bracket respectively secured on a front end portion and a rear end portion of the base.

2. A conveying apparatus according to claim 1, wherein one said roller of the endless outer belt has a shaft of said roller connected with a driving shaft of a driving motor for operatively driving the outer belt rotatably mounted on the base.

3. A conveying apparatus according to claim 1, wherein said outer belt has a plurality of inner belts and substrate plates linearly disposed within said outer belt, each said inner belt wound on each said substrate plate and each said inner belt movably engageable with said outer belt having an outer surface of said inner belt movably contacting an inner surface of said outer belt.

4. A conveying apparatus according to claim 1, wherein anyone of said front and rear rollers of said outer belt is provided with a one-direction control means mounted on the base, allowing one-way movement of the outer belt on said frame when treading the outer belt by a walker; and said functional supporting frame including a pair of handrails mounted on said base.

5. A conveying apparatus according to claim 4, wherein said one-direction control means includes a ratchet gear secured to one of said front and rear rollers of said outer belt, and a pawl secured to said base, allowing one-way movement of said outer belt on said front and rear rollers.

6. A conveying apparatus according to claim 1, wherein said conveying apparatus is secured to said functional supporting frame including a plurality of wheels rotatably secured to a bottom of said frame, a baby seat mounted on said frame, and a removable handle detachably secured on said frame and said conveying apparatus attached to said functional supporting frame for providing a baby walker and stroller for a baby walking on said belts outdoors and indoors.

7. A conveying apparatus according to claim 1, wherein each said arcuate end portion of said substrate plate is rotatably mounted with an inner roller for rotatably winding said inner belt on two said inner rollers of said substrate plate.

8. A conveying apparatus according to claim 2, wherein said base of said conveying apparatus is attached to a functional supporting frame having a plurality of handrails extending upwardly from said functional supporting frame.

* * * * *